US012456034B2

(12) United States Patent
Munoz Delgado

(10) Patent No.: US 12,456,034 B2
(45) Date of Patent: Oct. 28, 2025

(54) IMAGE CLASSIFICATION EXPLANATION BY GENERATING BOUNDARY CROSSING EXAMPLES WITH REMOVED FEATURES VIA FILTER SUPPRESSION

(71) Applicant: Robert Bosch GmbH, Stuttgart (DE)

(72) Inventor: Andres Mauricio Munoz Delgado, Weil Der Stadt (DE)

(73) Assignee: ROBERT BOSCH GMBH, Stuttgart (DE)

(*) Notice: Subject to any disclaimer, the term of this patent is extended or adjusted under 35 U.S.C. 154(b) by 1204 days.

(21) Appl. No.: 17/229,275

(22) Filed: Apr. 13, 2021

(65) Prior Publication Data

US 2021/0326661 A1   Oct. 21, 2021

(30) Foreign Application Priority Data

Apr. 20, 2020   (EP) ..................... 20170305

(51) Int. Cl.
*G06N 3/045* (2023.01)
*G06N 3/0455* (2023.01)
*G06N 3/0464* (2023.01)
*G06N 3/0475* (2023.01)
*G06N 3/094* (2023.01)
*G06N 5/045* (2023.01)

(52) U.S. Cl.
CPC .......... *G06N 3/045* (2023.01); *G06N 3/0455* (2023.01); *G06N 3/0464* (2023.01); *G06N 3/0475* (2023.01); *G06N 3/094* (2023.01); *G06N 5/045* (2013.01)

(58) Field of Classification Search
CPC .... G06N 3/045; G06N 3/0455; G06N 3/0464; G06N 3/0475; G06N 3/094; G06N 5/045
See application file for complete search history.

(56) References Cited

PUBLICATIONS

Alzantot et al., "NeuroMask: Explaining Predictions of Deep Neural Networks through Mask Learning", 2019, 2019 IEEE International Conference on Smart Computing (SMARTCOMP), vol. 2019, pp. 81-86 (Year: 2019).*

(Continued)

*Primary Examiner* — Leonard A Sieger
(74) *Attorney, Agent, or Firm* — NORTON ROSE FULBRIGHT US LLP

(57) ABSTRACT

A computer-implemented method for explaining a classification of one or more classifier inputs by a trained classifier. A generative model is used that generates inputs for the trained classifier. The generative model comprises multiple filters. Generator inputs corresponding to the one or more classifier inputs are obtained, where a generator input causes the generative model to approximately generate the corresponding classifier input. Filter suppression factors are determined for the multiple filters of the generative model. A filter suppression factor for a filter indicates a degree of suppression for a filter output of the filter. The filter suppression factors are determined based on an effect of adapting the classifier inputs according to the filter suppression factors on the classification by the trained classifier. The classification explanation is based on the filter suppression factors.

13 Claims, 6 Drawing Sheets

(56) References Cited

PUBLICATIONS

Samangouei et al., "ExplainGAN: Model Explanation via Decision Boundary Crossing Transformations", Proceedings of the European Conference on Computer Vision (ECCV), 2018, pp. 666-681 (Year: 2018).*

Fong et al., "Interpretable Explanations of Black Boxes by Meaningful Perturbation", 2017, Proceedings of the IEEE International Conference on Computer Vision (ICCV), vol. 2017, pp. 3429-3437 (Year: 2017).*

Kaneko et al., "Generative Attribute Controller with Conditional Filtered Generative Adversarial Networks", 2017, Proceedings of the IEEE conference on computer vision and pattern recognition, vol. 2017, pp. 6089-6098 (Year: 2017).*

Bau et al., "GAN Dissection: Visualizing and Understanding Generative Adversarial Networks", 2018, arXiv, v2, pp. 1-18 (Year: 2018).*

Yu et al., "Generative Image Inpainting with Contextual Attention", 2018, Proceedings of the IEEE Conference on Computer Vision and Pattern Recognition (CVPR), vol. 2018, pp. 5505-5514 (Year: 2018).*

Agarwal et al., "Removing input features via a generative model to explain their attributions to classifier's decisions", 2019, arXiv, v1, pp. 1-35 (Year: 2019).*

Mousa-Pasandi et al., "Convolutional Neural Network Pruning Using Filter Attenuation", Feb. 9, 2020, arXiv, v1, pp. 1-5 (Year: 2020).*

Abbasi-Asl et al., "Interpreting Convolutional Neural Networks Through Compression", 2017, arXiv, v1, pp. 1-5 (Year: 2017).*

Weimer et al., "Design of deep convolutional neural network architectures for automated feature extraction in industrial inspection", 2016, CIRP Annals, vol. 65 No. 1, pp. 417-420 (Year: 2016).*

Kaneko et al., "Class-Distinct and Class-Mutual Image Generation with GANs", 2019, arXiv, v2, pp. 6089-6098 (Year: 2019).*

Zhou et al., "Revisiting the Importance of Individual Units in CNNs via Ablation", 2018, arXiv, v1, pp. 1-10 (Year: 2018).*

Zhang et al., "Interpretable Convolutional Neural Networks", 2018, Proceedings of the IEEE Conference on Computer Vision and Pattern Recognition (CVPR), vol. 2018, pp. 8827-8836 (Year: 2018).*

Ruth Fong, et al., "Interpretable Explanations of Black Boxes By Meaningful Perturbation," Cornell University, 2018, pp. 1-9. <https://arxiv.org/pdf/1704.03296.pdf> Downloaded Apr. 13, 2021.

Alec Radford et al., "Unsupervised Representation Learning With Deep Convolutional Generative Adversarial Networks," Cornell University, 2016, pp. 1-16. <https://arxiv.org/pdf/1511.06434.pdf> Downloaded Apr. 13, 2021.

Olaf Ronneberger et al., "U-Net: Convolutional Networks for Biomedical Image Segmentation," Cornell University, 2015, pp. 1-8. <https://arxiv.org/pdf/1505.04597.pdf> Downloaded Apr. 13, 2021.

Diederik P. Kingma et al., "ADAM: A Method for Stochastic Optimization", Cornell University, 2017, pp. 1-15. <https://arxiv.org/pdf/1412.6980.pdf> Downloaded Apr. 13, 2021.

Antonia Creswell et al., "Inverting the Generator of a Generative Adversarial Network," Cornell University, 2018, pp. 1-8. <https://arxiv.org/pdf/1802.05701.pdf> Downloaded Apr. 13, 2021.

Chun-Hao Chang, et al., "Interpreting Neural Network Classifications With Variational Dropout Saliency Maps," 2017, pp. 1-9. <http://www.cs.toronto.edu/~kingsley/documents/interpreting-neural-network-camera-ready.pdf>.

Raghuram Mandyam Annasamy, et al., "Towards Better Interpretability in Deep Q-Networks," Cornell University, 2018, pp. 1-16. <https://arxiv.org/pdf/1809.05630.pdf>.

Lukas Hoyer, et al., "Grid Saliency for Context Explanations of Semantic Segmentation," Cornell University, 2019, pp. 1-24. <https://arxiv.org/pdf/1907.13054.pdf>.

Singh, et al.: "FCA-Net: Adversarial Learning for Skin Lesion Segmentation Based on Multi-Scale Features and Factorized Channel Attention," IEEE Access, 7 (2019), pp. 130552-130656.

* cited by examiner

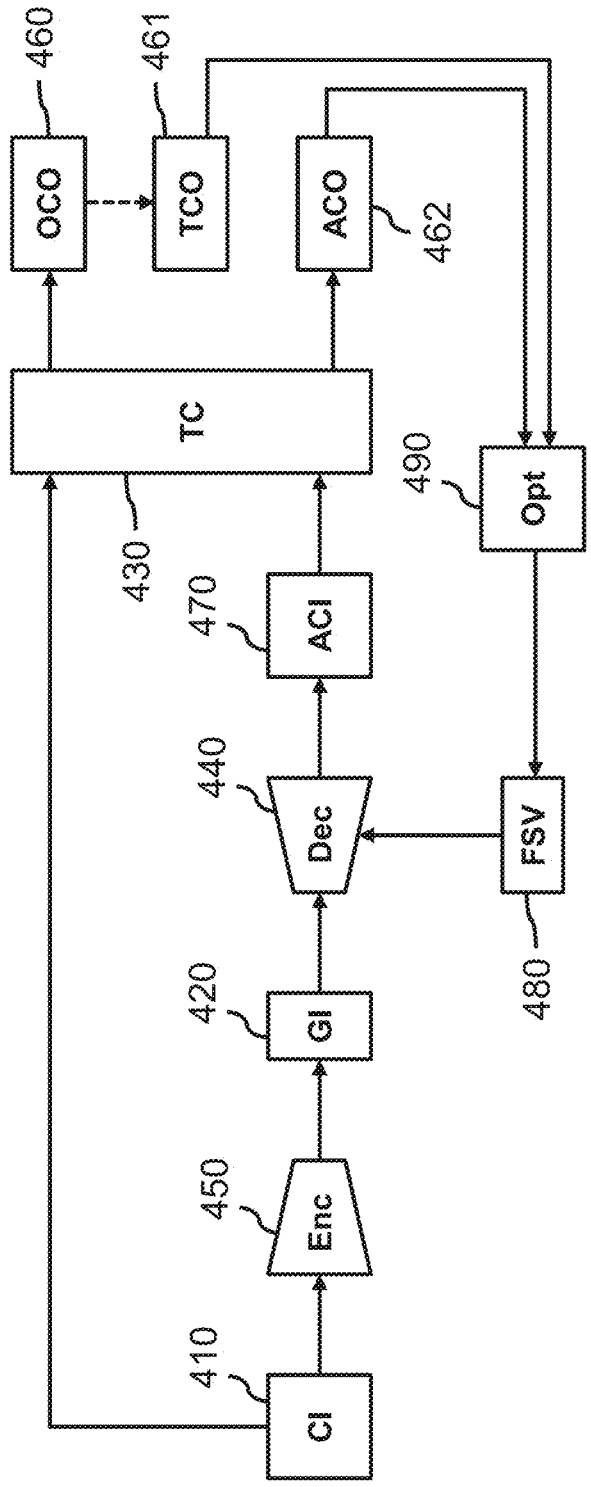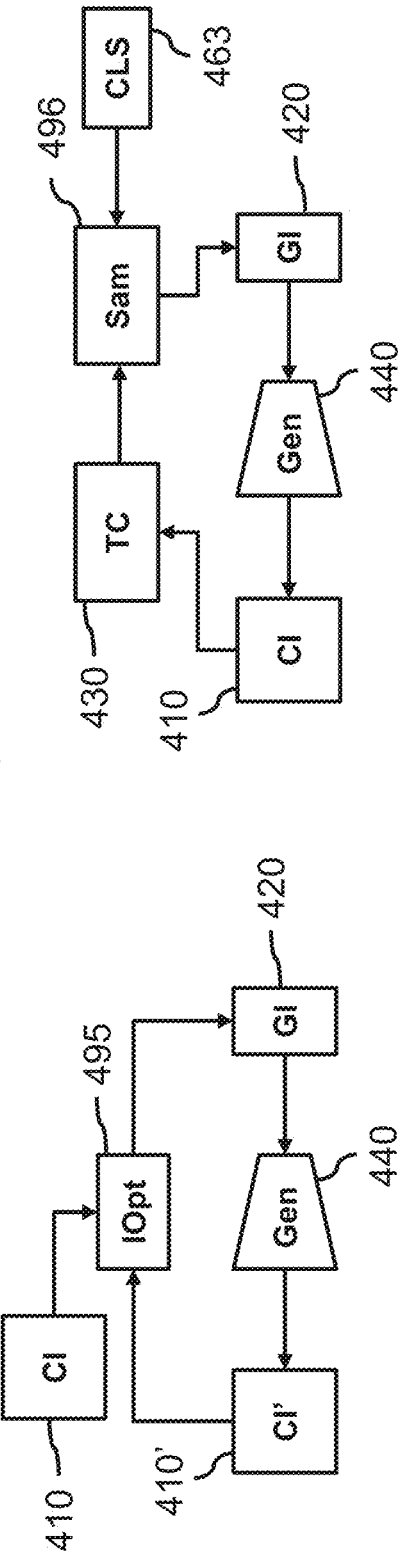
Fig. 4a
Fig. 4b
Fig. 4c

IMAGE CLASSIFICATION EXPLANATION BY GENERATING BOUNDARY CROSSING EXAMPLES WITH REMOVED FEATURES VIA FILTER SUPPRESSION

CROSS REFERENCE

The present application claims the benefit under 35 U.S.C. § 119 of European Patent Application No. EP 20170305.5 filed on Apr. 20, 2020, which is expressly incorporated herein by reference in its entirety.

FIELD

The present invention relates to a computer-implemented method of determining a classification explanation, and to a corresponding computer-implemented method. The present invention further relates to a computer-readable medium comprising instructions to perform the above method.

BACKGROUND INFORMATION

Machine-learned ('trained') classifiers, also known as classification models, are widely used in many real-life application domains, such as optical quality inspection in manufacturing; hazard detection in autonomous driving; robotics; building control, etc. For example, machine learnable classifiers such as neural network classifiers may be trained to classify a state of a physical system, such as an autonomous vehicle or a robot, etc., or the system's environment, e.g., an object manufactured in a manufacturing plant, a road on which the vehicle is travelling, a workspace of a robot, etc., based on sensor data which is acquired by one or more sensors. Such a state may be classified into two or more classes, for example, "OK" or "not OK"; "safe" or "unsafe"; "cat", "dog", or "tree", etc. Having classified the state, the physical system may be monitored or controlled, e.g., by adjusting control parameters of the manufacturing system based on a classification; by controlling one or more actuators of a robot; etc.

Generally, as is conventional in machine learning, a machine-learnable classifier such as a neural network classifier may be trained on training data in order to provide a classification. By training the classifier, the classifier may provide such a classification without being explicitly programmed on how to do so. For example, for classifying an image, the classifier may be trained on a training dataset comprising images whose classifications are known. For example, a classifier may be trained as a multiclass identifier, by which an image may be classified as, e.g., "cat", "dog", or "tree". Another example is that the trained classifier may be trained to be a binary classifier, e.g., classifying an input into one of only two complementary categories, "OK" or "NOK". However, the trained classifier may also be trained on a dataset with unknown categories, e.g. by clustering/automatic classification.

As machine-learned classifiers are deployed in real-life situations, it becomes increasingly important to determine explanations as to why a classifier classifies one or more inputs into a class. Explainability is a core element of both model verification (did we build the model right?) and validation (did we build the right model?). Large, state-of-the-art networks models are easily tricked into providing false, high confidence predictions; thus, their true generalization performance has been called into question. As with any other software component intended for deployment in the field, it is critical that the models can be quantitatively verified and validated, e.g., to establish the degree to which a model has learned a desired input-to-output relationship. Current state-of-the-art techniques in machine and deep learning lack metrics and practices to measure this effect, often working with limited, and thus inherently biased, datasets, and producing models that are over-parametrized in comparison to the amount of data available. Thus, there is often a wide gap between what a model has actually learned and what the implementer thinks the model has learned.

Over the past several years, the need for providing explanations along with model classifications has been recognised, and several approaches have been proposed and used at an academic level with varying degrees of success. One line of works attempts to visualize what a neural network classifier has learned by visualizing per-pixel activation patterns. The goal is to find how individual pixels affect the classification of an input image.

An example of such an approach is provided in the paper "Interpretable explanations of black boxes by meaningful perturbation" by R. Fong and A. Vedaldi (available at https://arxiv.org/pdf/1704.03296 and incorporated herein by reference). In this paper, an optimization is proposed in which the goal is to find the smallest deletion mask such that perturbing the image as indicated by the mask, causes its classification to drop significantly. Accordingly, a cause-and-effect relationship is sought between changes made to the input and corresponding changes effected in the resulting classification. To end users, such changes may confirm whether the model is sensitive to expected elements, e.g., whether a pedestrian detector is sensitive to the pedestrian, or the sky or weather condition.

SUMMARY

It would be desirable to improve techniques for explaining classifications. Although various explainability techniques exist in the related art, the inventors observed that these existing techniques often disagree with each other. Moreover, existing techniques typically do not present results that are intuitive for a layperson to understand and grasp, requiring extensive interpretation from experts in the field. For example, in many cases, pixel-level explanations of a classification are established that result in changing a classifier output, but that do not correspond to meaningful concepts present in the image. Because such pixel-level explanations effectively do not represent meaningful changes to the image, they are hard to understand or meaningless to humans, but also hard to extract useful information from in an automated way, e.g., in order to further classify explanations in terms of root causes.

The inventors moreover realized that the way existing techniques perturb inputs to get a change in classification, is not suitable for various datasets occurring in practice. For example, the inventors envisaged to use explainability techniques for optical quality inspection. The inventors found that in various manufacturing processes, images of manufactured products have significantly different data statistics from the kinds of datasets to which existing explainability techniques are typically applied; as a consequence, such techniques are unfit this type of data. For example, as the inventors realized, adding a black square, as a perturbation, to a black and white image of a manufactured product, may cause the perturbation to actually add information that the classifier may be sensitive to. In such cases, it is therefore not clear whether changes in output classification really stem from information being withheld or deleted, or rather from the addition of such a new element as new information the model is trying to interpret. Accordingly, in such cases, the explanation may not provide a meaningful explanation for the information present in the image.

To address these and other concerns, in accordance with a first aspect of the present invention, a computer-implemented method of determining a classification explanation for a trained classifier is provided. In accordance with another aspect of the present invention, a corresponding system is provided. In accordance with an aspect of the present invention, a computer-readable medium is provided.

Various features relate to the determination of a classification explanation for a trained classifier. The explanation may be for one or more classifier inputs that are each classified by the classifier into the same class. The explanation may indicate factors contributing to the classifier classifying the inputs into that class, in other words, adaptations that, when applied, affect the classification by the classifier into that class. For example, the adaptations may cause a change in classification or at least a drop in classification score for that class.

It is conventional to use pixel-level adaptations to an input image to explain its classification, for example, from the paper "Interpretable explanations of black boxes by meaningful perturbation" described above. For example, as is known, if blacking out particular input pixels of a classifier input image causes a significant drop in classification score, this may be seen as an explanation in the sense of indicating aspects of the classifier input that provide a significant contribution to the original classification score.

Interestingly, however, instead of using such pixel-level adaptations, the inventors envisaged to use a generative model to adapt the classification inputs. A generative model is a model that is trained on a training dataset to generate synthetic instances that are similar to instances of the training dataset, e.g., a generator part of a Generative Adversarial Network (GAN) or a decoder part of a Variational Auto-Encoder (VAE). For example, when trained on a dataset of images of real human faces, a generative model may learn to generate realistic-looking, but synthetic, face images. In order to generate such instances, a generative model may use a number of filters. For example, the generative model may be a convolutional network (also known as convolutional neural network) or other type of neural network in which filters are used to generate filter outputs at respective layers of the network.

As it turns out, such generative models using filters have the interesting property that the suppression of filter outputs of particular filters of the generative model often leads to meaningful variations in the generated synthetic instance. Accordingly, respective filters of the generative model may be associated with respective aspects of the generated instance. For example, in an image generation model, respective filters or sets of filters may be associated with the generation of respective objects (or other types of features) that are part of the image that is to be generated. In a generator of face images, one set of filters could be responsible for generating wrinkles whereas another set of filters could be responsible for generating a pair of glasses. If some or all filters responsible for generating a particular object are suppressed, e.g., their filter outputs are modulated during the generation process, this may lead to the corresponding object being absent, or at least less prominent, in the resulting instance. The resulting instances often however still seem realistic. For example, the suppression of the pair of glasses would not leave an empty space in the image but would instead result in, e.g., synthetic skin being generated.

Essentially, filter-based generative models can thus compensate for a loss of information due to the suppression of the filters by including other information.

The inventors envisaged to use this property to generate meaningful adaptations to classifier inputs, and to use the effect that these meaningful adaptations have on the classification by the trained classifier to explain the classification. To this end, a generative model is used whose outputs can be input to the trained classifier. Given an input instance to the trained classifier for which an explanation is to be determined, a generator input may be determined (or otherwise obtained) that causes the generative model to approximately generate the classifier input. By manipulating the way that the generative model thus (approximately) generates the classifier input, adaptations of the classifier input may be obtained that are meaningful, e.g., remain on the natural image manifold.

Accordingly, many adaptations can be made that are meaningful in terms of the information contained in the classifier input (e.g., representing information about presence of particular objects or other types of features in the generated instance, e.g., representing whether or not a person has glasses). However, not all of these meaningful adaptations will be relevant for the trained classifier (e.g., the trained classifier may classify face images according to whether or not the person has a sunburn, for which having glasses would be irrelevant). The inventors envisaged to try out various such meaningful adaptations and observe which of them affect the classification by the trained classifier to thus obtain an explanation of the classification in terms of such meaningful adaptations.

Specifically, adaptations to the generation process of the generative model may be captured in terms of filter suppression factors for respective filters of the generative model. A filter suppression factor may indicate a degree of suppression for a filter output of the filter. By adapting classifier inputs according to these filter suppression factors (meaning modulating filter outputs of the generative model as it generates the classifier input) and then applying the trained classifier to the resulting adapted classifier input, an effect of the filter suppression factors may be determined. For example, the filter suppression factors may be applied individually to observe their respective effects, or, more preferably, an effect on the classification of modulating several filters at the same time may be determined.

Accordingly, the classification of the trained classifier for an input instance may be explained based on these filter suppression factors. For example, if the modulation of filter outputs by respective filter suppression factors causes the adapted classifier input to be classified into a different class than the original classifier input, then this adapted classifier may provide an explanation for the classification the form of a counterfactual for the original classifier input. Such a counterfactual provides important insights into which features of the original classifier input led the trained classifier to arrive at its classification.

Also the filter suppression factors themselves can be considered to represent an explanation. In particular, given multiple classifier inputs that are classified by the trained classifier into the same class, a set of filter suppression factors may be determined that indicate which aspects of the classifier inputs generally affect the classification by the trained classifier. This is possible because, interestingly, a filter suppression factor typically has similar effects for different classifier inputs. For example, a particular generator filter may be associated with the generation of trees and accordingly, suppressing the filter may remove trees in different images, even if these trees occur at different locations in the respective images. Due to the use of a generative model, these trees may moreover be compensated for in the generated instance according to the context of that particular classifier input, e.g., by inserting grass or flowers at the respective places. This is contrast, for example, to determining a pixel mask to be applied to input images of an image classifier: respective images will typically contain objects at different locations so a common pixel mask cannot provide a common explanation for multiple images in terms of the presence or absence of such objects.

Preferably, the set of filters for which filter suppression factors are determined represents a wide range of objects or aspects that may contribute to the classification decision of the trained classifier, and not just one particular contributing object or aspect. For example, filter suppression factors may be determined for all filters of the generative model, or for all filters of one or more layers of the generative model. Training of a generative model tends to compartmentalize its latent space in such a way, that different concepts are represented orthogonally across distinct filters, allowing different aspects to be suppressed independently from each other. It is also preferred to use a generative model that is trained on substantially the same dataset as the trained classifier, e.g., the same dataset or a randomly sampled subset of the training dataset of the trained classifier. This way, the instances generated by the generative model are more representative of typical inputs of the trained classifier and hence also represent more meaningful adaptations.

Generally, using the techniques presented herein, explanations for a trained classifier may be obtained in terms of semantically meaningful adaptations to its input instances. Effectively, perturbations are modelled in a more mature way, so that the changes to a classifier input are more likely to result in another natural classifier input. Considering as an example an image classifier that relies on the presence of a pair of glasses on a person's face to make a classification decision. Using pixel-level methods, for example, it may suffice for a drop in classification score to remove the glasses over just one eye. Since a generative model will typically be trained either to generate glasses or not to generate them, however, suppressing filters related to glasses will usually result in the glasses to be removed over both eyes, leading to a more natural and thus more easily understandable explanation.

As a consequence of adapting classifier inputs in a more natural way, also the probability of obtaining adversarial-type explanations, e.g., almost invisible pixel-level changes that nonetheless cause the classification by the trained classifier to change, is reduced. Also the problem that a pixel-level perturbation may introduce information to the classifier input rather than removing it, is addressed. Providing explanations in terms of filter suppression factors moreover allows to represent explanations in an efficient way, e.g., in terms of a set of factors instead of as an image. This is advantageous for further automated processing of these explanations, e.g., for applying further machine learning models on them, but also for interpreting these explanations by humans.

Explanations for different input instances are also made more comparable, e.g., suppressing glasses at different locations in an input image may be represented similarly in terms of filter suppression factors. This allows for example to compile statistics or otherwise gain insight into how often particular aspects of classifier inputs are used by a trained classifier to reach a decision.

Interestingly, the trained classifier can be treated essentially as a black box. Thus, the techniques are applicable to a many trained classifiers. The trained classifier does not need to provide additional functionality beyond classification, e.g., in many cases the trained classifier is not a segmentation model or the like. Accordingly, an explanation may be determined for a trained classier for whose outputs no interpretation was available yet.

Optionally, the trained classifier may be an image classifier. For image classification, various generative models are known that work particularly well in combination with the presented techniques, e.g., convolutional neural networks and more specifically fully convolutional networks. It has been observed in various practical settings that adapting image generation in such networks by suppressing filters leads to realistic-looking adaptations, and that various relevant semantically interpretable aspects of the generated images can be tuned by suppressing filters.

Optionally, the input instance may comprise an image of a product produced in a manufacturing process. The trained classifier may classify such images, for example, into an "OK" class and a "Not OK" (NOK) class. In such cases, it is relevant to know not only that there was a problem with the produced product, but also why there was a problem. For example, this information for individual products or aggregated over a batch of products can be reported to a supervisor of the manufacturing process so that appropriate measures can be taken. As a further optional step, the explanation for an image as determined based on the filter suppression factors, may be classified into a predefined set of possible anomalies. The accordingly detected anomaly can for example be reported to a supervisor to help take the appropriate measures, or used automatically to determine a control signal for controlling the manufacturing process, e.g., by adapting one or more control parameters of the manufacturing process, such as a speed/temperature/pressure, or by operating the manufacturing process in a safe mode.

More generally, the input instances of the trained classifier can be various types of sensor signals, including video data, radar data, LiDAR data, ultrasonic data, motion data, and thermal imaging camera data. Specifically, as is known per se, various such sensor signals may be represented in a 2-D or N-D spatial grid and therefore be processed by various image processing techniques or their generalizations, e.g., image generation models and/or image classifiers. Accordingly, by using a suitable generative model and trained classifier, various types of sensor signal can be supported.

Optionally, the filter suppression factors may be determined by optimizing an effect that the filter suppression factors together have on the classification of the classifier inputs. The optimization may comprise minimizing a difference between a target classifier output and affected classifier outputs of the trained classifier for the one or more classifier inputs affected by the filter suppression factors. For example, the target classifier output may indicate a class different from the class that the classifier input(s) is classified into, or may indicate a decision boundary for that class. Accordingly, the difference may be used to encourage a change in classification or a least a drop in classification score for the classifier inputs. The optimization may also comprise a regularization term, for example, a regularization term for minimizing an overall degree of suppression indicated by the filter suppression factors. The regularization term preferably is sparsity-inducing, e.g., restricts the number of filters that are suppressed, e.g., using a L0 norm or an approximation thereof. This way, it may be encouraged to restrict the amount of change made to the classifier inputs and accordingly obtain an explanation that relates as much as possible to the original classifier inputs.

Optionally, the optimization may be further configured to minimize a degree to which an output of the generative model seems synthetic. This degree may be determined by a machine learnable model referred to as a discriminative model. For example, the discriminative model can be a discriminator part of a Generative Adversarial Model (GAN), for example, a GAN that has the generator as generator part. This is not necessary though; the discriminative model can also be trained separately from the generative model. Including such a realisticness degree further encourages the optimization to determine realistic-seeming adaptations to trained inputs, and accordingly further improves the quality of the determined explanations.

Optionally, when minimizing the overall degree of suppression indicated by the filter suppression factors, more unique filters may be penalized less strongly than less unique filters. To what extent a filter is unique may be indicated by uniqueness scores of the respective filters. Accordingly, it may be encouraged to include more unique filters in an explanation of a classification, leading to less redundancy in the output explanation. This improves the quality of the explanations, e.g., by reducing the risk of adversarial solutions since individual filter suppressions more directly correspond to specific and separate adaptations to the classifier inputs.

Optionally, the classification explanation that is output, may be determined by determining differences between a classifier input and a corresponding adapted classifier input according to one or more metrics. For example, the metrics may include a pixelwise difference, a difference in colour distribution, and/or an entropy. These metrics or their combinations may be characteristic of a particular way the trained classifier makes a decision. Accordingly, for example, they can be used as features for a further machine learning model to be applied to the explanation. This allows to get a particularly compressed representation of the classification decision, simplifying further automated processing.

Optionally, a filter output of a filter of the generative model may be modulated according to a filter suppression factor by multiplying elements of the filter output with that filter suppression factor. For example, the filter suppression factors may be values between 0 and 1, with 0 indicating that the filter is to be fully suppressed and 1 indicating that the filter is not to be suppressed at all. This is a flexible but efficiently implementable (and optimizable) solution, but there are also alternatives. For example, the filter suppression factors can be booleans, indicating no suppression or full suppression; or can be applied by using another type of computation than multiplication, for example, according to any function that is increasing in both the activation value to which the suppression factor is to be applied, and the suppression factor itself.

Optionally, a classifier input may be obtained, and based on this, a generator input corresponding to the classifier input may be determined. This way, an explanation for a given classifier input can be determined. Given a classifier input, it is typically not possible to determine a generator input that exactly reproduces the classifier input, e.g., since the number of possible classifier inputs is often much bigger than the number of possible generator inputs. Accordingly, a generator input may be determined that approximately generates the classifier input, e.g., based on an optimization involving a difference between classifier inputs and their approximations. For example, the optimization may be performed to determine the generator input from the classifier input (as is known per se for Generative Adversarial Networks), or to train a model to determine generator inputs from classifier inputs (e.g., an encoder of an autoencoder). In any case, such optimizations are typically heuristic and/or arrive at a local optimum. Accordingly, the generator input corresponding to a classifier input will in practice often not be the generator input that provides the absolute best approximation over all possible generator inputs.

Optionally, a class of the trained classifier may be obtained and, based on this, one or more generator inputs may be generated causing the generative model to generate classifier inputs from that class. This way, an explanation can be determined of a more global behaviour of the trained classifier, e.g., an explanation of why the trained classifier generally classifies classifier inputs into a given class. For example, classifier inputs from the class may be obtained by rejection sampling: by generating classifier inputs and checking whether they belong to the class. Accordingly, a representative set of generator inputs may be obtained. It is also possible to check whether a generated classifier input satisfies a particular property in addition to belonging to the class, or to hand-pick the generator inputs or the classifier inputs. This allows to study, for a given set of classifier inputs sharing a particular characteristic, how the trained classifier arrives at its classification decision for that set of classifier inputs.

Optionally, the classification explanation may be output in a sensory perceptible manner to a user, for example shown on a screen. For example, the classification explanation may comprise an adaptation of the classifier input(s) whose classification is to be explained, according to the determined filter suppression factors. Such an adapted classifier input whose classification is affected (e.g., it may belong to a different class or may lie at a decision boundary), may be referred to as a counterfactual. For example, the original classifier input may be output alongside one or more counterfactuals; the counterfactuals may be used to emphasize parts of a presented classifier input; or the other way around. Other types of explanations that are determined based on the filter suppression factors, e.g., a classification of the filter suppression factors, may also be output in any suitable way. Accordingly, it is enabled to deliver actionable information on the state of the trained classifier and/or the available data. For example, hidden biases may be revealed that cannot be detected, for example, with traditional performance assessments methods like sensitivity or specificity measurements.

Classification explanations as provided herein may be particularly useful for end users, e.g., a person supervising a manufacturing process who wants to understand problems with manufactured products, or a clinician who wants to understand why a medical image classification model arrived at a given classification. In such cases, the classification explanation may be regarded as an explanation of why the classifier input actually belongs to the given class. In other words, the classifier may be assumed to be right to classify the input into the class and the user may want to use information about why the classifier (rightly) classified the input into the class to improve their own understanding about this output. This would correspond for example to a mature trained classifier deployed in the field. By providing more semantically meaningful explanations, e.g., classifier inputs that have been adapted in a meaningful and/or realistic way, the feedback that such end users obtain is greatly improved.

However, also at a stage where the trained classifier itself is still being developed (which may be after deployment in the field), the classification explanation can be valuable to a user. In this case, the user can be a model developer who may use the classification explanation to further improve the model. For example, if the classification explanation indicates parts of a classifier input, e.g., image regions, that do not seem relevant to a particular classification, then this may indicate a problem with the training, for example hidden biases in the training dataset, a lack of training examples of a given type, or a problem with the model architecture of the trained classifier. In such cases, the classification of the trained classifier is not necessarily assumed to be correct and the classification explanation may be used to understand why the classifier wrongly classified an input in the class so that such a wrong classification may be remedied.

Optionally, an adapted classifier input can be output to the user, who can then provide a desired classification of the adapted classifier input. This desired classification can then be associated with the adapted classifier input for use (e.g., as training data and/or test data) in re-training the trained classifier using the adapted classifier input and the desired classification. The re-training can be performed by the same system or a different system. For example, the adapted classifier input may be obtained by performing an optimization that encourages classifications near a decision boundary of the trained classifier. Accordingly, valuable additional training data may be obtained by which the trained classifier can be improved. Through the use of a generative model, the adapted classifier inputs are more realistic, and accordingly, more high-quality training data can be obtained. Moreover, by varying generator inputs of existing training instances, or randomly generating generator inputs, it is possible to freely generate additional training data in the form of counterfactuals for any given number of classifier or generator inputs.

For example, generated counterfactuals may represent, e.g., visually, the decision boundary for a given input model. Should this decision boundary represent undesired biases (e.g. a given counterfactual should not have been classified differently from the original image), the counterfactuals can be used to retrain and/or finetune the existing model accordingly.

When using an optimization that balances between on the one hand a difference between a target classifier output and adapted classifier outputs and on the other hand an overall degree of suppression, these two aspects may be weighted in the optimization by means of respective hyperparameters. These hyperparameters may be learned automatically, which may comprise repeating the process of determining filter suppression factors for respective (e.g., random) generator inputs several times. By selecting hyperparameters appropriately, the performance of the techniques presented herein may be tuned. For example, it may be ensured that the adapted classifier inputs actually represent counterfactuals of a different class, e.g., by selecting the hyperparameters such that the classifier output difference is weighted sufficiently, but on the other hand also that not too much change from the original input is allowed, e.g., by selecting the hyperparameters such that the overall degree of suppression is weighted sufficiently. The hyperparameters can be learned with a grid search, for example.

The various trained models used herein, e.g., the trained classifier and the generative model, may be parameterized by respective sets of parameters. For example, the generative model and/or the trained classifier may be neural networks. Neural networks are also known as artificial neural networks. Examples include deep neural networks and convolutional neural networks. In this case, the set of parameters may comprise weights of nodes of the neural network. For example, the number of layers of the model may be at least 5 or at least 10, and the number of nodes and/or weights may be at least 1000 or at least 10000. Depending on the particular application, various known architectures for neural networks and other types of machine learnable models may be used. It is beneficial from the point of view of efficiency of training to use models which are amenable to gradient-based optimization, e.g., which are continuous and/or differentiable in their sets of parameters.

It will be appreciated by those skilled in the art that two or more of the above-mentioned embodiments, implementations, and/or optional aspects of the present invention may be combined in any way deemed useful.

Modifications and variations of any system and/or any computer readable medium, which correspond to the described modifications and variations of a corresponding computer-implemented method, can be carried out by a person skilled in the art on the basis of the present description.

BRIEF DESCRIPTION OF THE DRAWINGS

These and other aspects of the present invention will be apparent from and elucidated further with reference to the embodiments described by way of example in the following description and with reference to the figures.

FIG. 4a shows an example of how to determine one or more filter suppression factors for explaining a classification, in accordance with an example embodiment of the present invention.

FIG. 4b shows an example of determining a generator input, in accordance with an example embodiment of the present invention.

FIG. 4c shows an example of determining a generator input, in accordance with an example embodiment of the present invention.

It should be noted that the figures are purely diagrammatic and not drawn to scale. In the figures, elements which correspond to elements already described may have the same reference numerals.

DETAILED DESCRIPTION OF EXAMPLE EMBODIMENTS

Figure 1:
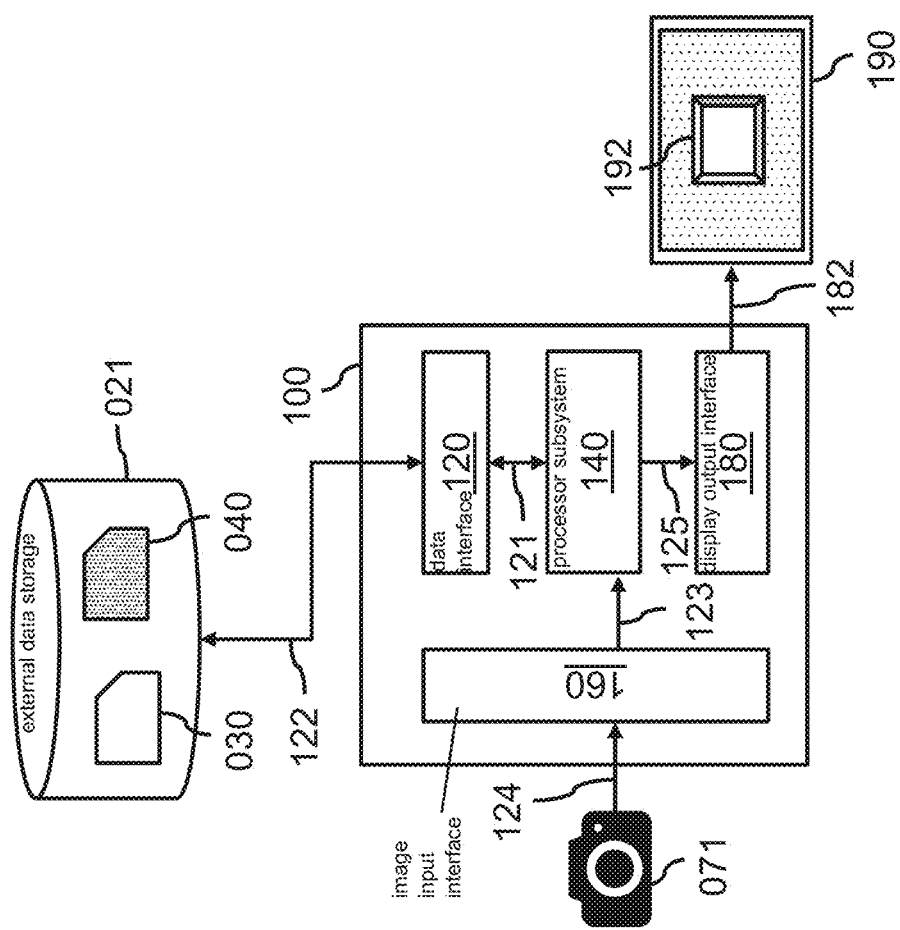
FIG. 1 shows a system for determining a classification explanation for a trained classifier, in accordance with an example embodiment of the present invention.

FIG. 1 shows a system 100 for determining a classification explanation for a trained classifier, in accordance with an example embodiment of the present invention. The classification explanation may be for one or more classifier inputs classified by the trained classifier into a same class. The system 100 may comprise a data interface 120 and a processor subsystem 140 which may internally communicate via data communication 121. Data interface 120 may be for accessing model data 030 defining the trained classifier. Data interface 120 may also be for accessing model data 040 defining a generative model. The generative model may be configured to generate a classifier input for the trained classifier from a generator input. The generative model may comprise multiple filters. A filter of the generative model may be configured to generate a filter output at an internal layer of the generative model.

The processor subsystem 140 may be configured to, during operation of the system 100 and using the data interface 120, access model data 030, 040. For example, as shown in FIG. 1, the data interface 120 may provide access 122 to an external data storage 021 which may comprise said model data 030, 040. Alternatively, the model data 030, 040 may be accessed from an internal data storage which is part of the system 100. Alternatively, the model data 030, 040 may be received via a network from another entity. In general, the data interface 120 may take various forms, such as a network interface to a local or wide area network, e.g., the Internet, a storage interface to an internal or external data storage, etc. The data storage 021 may take any known and suitable form.

Processor subsystem 140 may be configured to, during operation of the system 100 and using the data interface 120, obtain generator inputs corresponding to the one or more classifier inputs. A generator input may cause the generative model to approximately generate the corresponding classifier input.

Processor subsystem 140 may be further configured to, during operation of the system 100 and using the data interface 120, determine filter suppression factors for the multiple filters of the generative model. A filter suppression factor for a filter may indicate a degree of suppression for a filter output of the filter. The filter suppression factors may be determined based on an effect of adapting the classifier inputs according to the filter suppression factors on the classification by the trained classifier.

To determine this effect, processor subsystem 140 may adapt a classifier input according to one or more filter suppression factors by applying the generative model to the generator input corresponding to the classifier input, while modulating filter outputs of filters of the generative model according to the one or more filter suppression factors. To determine the effect, processor subsystem 140 may further apply the trained classifier to the adapted classifier input to obtain a classifier output affected by the one or more filter suppression factors. To determine the effect, processor subsystem 14 may further determine the classification explanation based on the filter suppression factors and outputting the classification explanation.

Processor subsystem 140 may also be configured to train the classifier and/or the generative model, e.g., based on a common dataset. Processor subsystem 140 may also be configured to learn hyperparameters used in an optimization for determining the filter suppression factors. For example, the determination of the filter suppression factors may be performed multiple times to learn such hyperparameters, e.g., in a grid search.

As an optional component, the system 100 may comprise an image input interface 160 or any other type of input interface for obtaining sensor data 124 from a sensor, such as a camera 071. Processor subsystem 140 may be configured to determine one or more classifier inputs to the trained classifier based on obtained sensor data 124. For example, the classifier inputs may be used to determine corresponding generator inputs, based on which filter suppression factors may be determined for explaining how the trained classifier classifies these classifier inputs. For example, the camera 071 may be configured to capture image data 124, processor subsystem 140 being configured to determine classifier inputs based on image data 124 obtained, via data communication 123, from input interface 160. The input interface may be configured for various types of sensor signals, e.g., video signals, radar/LiDAR signals, ultrasonic signals, etc.

As an optional component, the system 100 may comprise a display output interface 180 or any other type of output interface for outputting the determined classification explanation to a rendering device, such as a display 190. For example, the display output interface 180 may generate display data 182 for the display 190 which causes the display 190 to render the explanation in a sensory perceptible manner, e.g., as an on-screen visualisation 192 of classifier input(s) and corresponding adaptations according to the determined filter suppression factors. Optionally, the system 100 may comprise a user input interface (shown), such as a keyboard or a mouse. Using the user input interface, the system may obtain a desired classification of an adapted classifier input output to the user. The adapted classifier input may be stored along with its desired classification for a re-training of the trained classifier. Processor subsystem 140 may perform this re-training itself, but can also provide the adapted classifier input and desired classification to another party for performing the re-training.

As an optional component, the system 100 may comprise a control interface (not shown) for providing a control signal for controlling an external process, for example a manufacturing process being monitored. For example, the control interface can be a dedicated control interface such as Foundation Fieldbus, PROFIBUS, HART, Modbus, etc.; or a general-purpose communication interface arranged for digital communication with a control system, e.g., using USB, IEEE 1394, or similar interfaces. The control interface may communicate over a computer network, for example, a wireless personal area network, an internet, an intranet, a LAN, a WLAN, etc. For instance, the control interface may comprise a connector, e.g., a wireless connector, an Ethernet connector, a Wi-Fi, 4G or 4G antenna, a ZigBee chip, etc., as appropriate for the computer network. The control interface may also be an internal communication interface, e.g., a bus, an API, a storage interface, etc. Specifically, the control interface can be an actuator interface for providing, to an actuator, actuator data causing the actuator to effect an action in an environment of system 100. For example, processor subsystem 140 may be configured to determine the actuator data based at least in part on the determined classification explanation.

Various details and aspects of the operation of the system 100 will be further elucidated with reference to FIGS. 2a-5, including optional aspects thereof.

In general, the system 100 may be embodied as, or in, a single device or apparatus, such as a workstation, e.g., laptop or desktop-based, or a server. The device or apparatus may comprise one or more microprocessors which execute appropriate software. For example, the processor subsystem may be embodied by a single Central Processing Unit (CPU), but also by a combination or system of such CPUs and/or other types of processing units. The software may have been downloaded and/or stored in a corresponding memory, e.g., a volatile memory such as RAM or a non-volatile memory such as Flash. Alternatively, the functional units of the system, e.g., the data interface and the processor subsystem, may be implemented in the device or apparatus in the form of programmable logic, e.g., as a Field-Programmable Gate Array (FPGA) and/or a Graphics Processing Unit (GPU). In general, each functional unit of the system may be implemented in the form of a circuit. It is noted that the system 100 may also be implemented in a distributed manner, e.g., involving different devices or apparatuses, such as distributed servers, e.g., in the form of cloud computing.

Figure 2A:
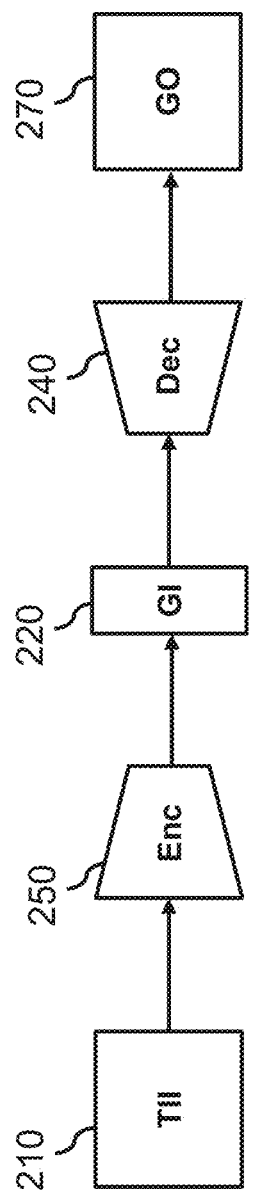
FIG. 2a shows an example of a generative model, in this case, a decoder part of an autoencoder, in accordance with an example embodiment of the present invention.

FIG. 2*a* shows a detailed, yet non-limiting example of a generative model, in this case, a decoder part of an autoencoder. Various types of autoencoders can be used herein, including regularized autoencoders and/or variational autoencoders. A variational autoencoder is preferred for its improved generalizability. Many autoencoder architectures suitable for various types of input data, e.g., images, are known and can be used.

Shown in the figure is an autoencoder comprising an encoder part Enc, 250, and a decoder part Dec, 240. Given an input instance II, 210, the encoder part Enc of the autoencoder may be configured to determine a representation GI, 220, of the input instance II. Based on that representation, the decoder part Dec may be configured to determine a synthetic output GO, 270.

The autoencoder may be trained on a training dataset of input instances to output synthetic outputs SO that are as similar as possible to the respective input instances II, e.g., in an optimization that minimizes a difference between the training input instances II and the corresponding synthetic outputs SO (possibly in combination with other terms, e.g., a regularization term). Accordingly, the autoencoder can learn to determine a representation GI that best allows such reconstruction. In the context of autoencoders, the output of the encoder part Enc may be called a "code", "latent representation", or "encoding".

Accordingly, the decoder part Dec of an autoencoder can be used as a generative model that can generate outputs GO (e.g., inputs to a trained classifier) from generator inputs GI. Interestingly, the encoder part Enc provides the reverse transformation from classifier inputs to generator inputs, e.g., autoencoders provide an efficient and accurate way to, given an instance, determine a generator input that causes the generative model Dec to approximately generate that instance.

Figure 2B:
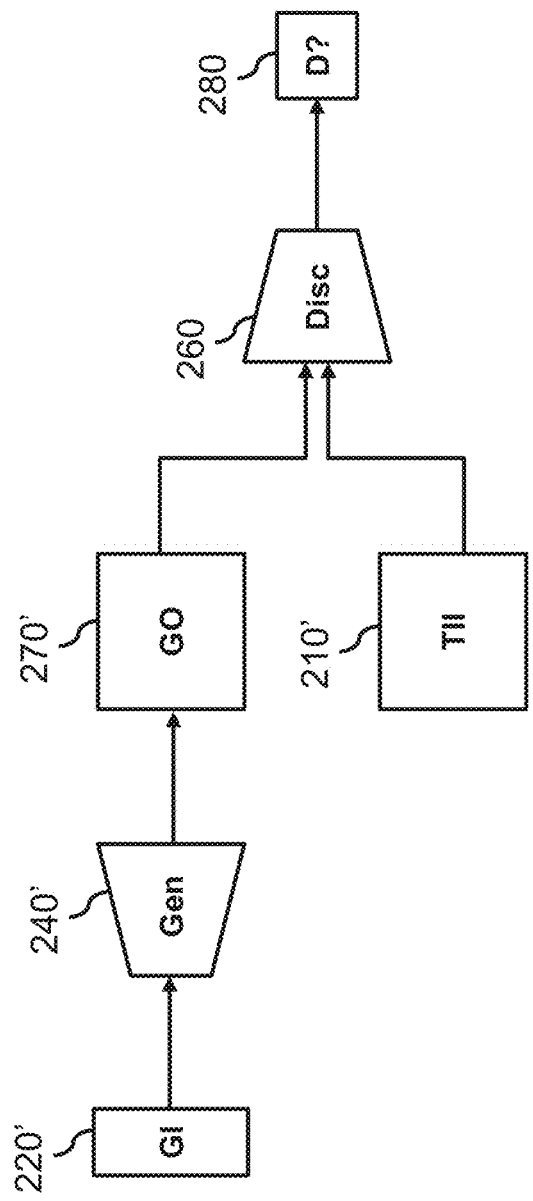
FIG. 2b shows an example of a generative model, in this case, a generator part of a Generative Adversarial Network (GAN), in accordance with an example embodiment of the present invention.

FIG. 2*b* shows a detailed, yet non-limiting example of a generative model, in this case, a generator part of a Generative Adversarial Network (GAN).

The GAN shown in this figure comprises a generative part Gen, 240', and a discriminative part Disc, 260. The generative part Gen may be configured to generate synthetic generator outputs GO, 270', from generator inputs GI, 220'. The discriminative part Disc may be configured to provide discriminator outputs D?, 280, that distinguish between the synthetic instances SII and training instances TII, 210'.

By training the generative part Gen to generate instances GO that the discriminator part Disc cannot distinguish from real training instances TII and training the discriminator part Disc to correctly distinguish between real instances TII and synthetic instances SII, both models can be trained effectively. For example, the generator part Gen may be trained alongside the discriminator part Disc until a Nash equilibrium is reached, in which case the generator Gen may produce samples which a highly effective discriminator Disc can no longer distinguish from actual samples TII. In this way, the generator may learn to model the data distribution of inputs TII.

Accordingly, the generative part Gen of a generative adversarial network can be used as a generative model that can generate outputs GO (e.g., inputs to a trained classifier) from generator inputs GI. Interestingly, also the discriminative part Disc is useful by itself, namely, as a model for determining a degree to which an output of the generative model Gen seems synthetic.

As an illustrative example, a known training objective for training a GAN is:

$$\min_G \max_D V(D, G) = \mathbb{E}_{x \sim p_{data}(x)}[\log D(x)] + \mathbb{E}_{z \sim p_z(z)}[\log(1 - D(G(z)))].$$

In this example, D is the discriminator Disc, G is the generator Gen, x is an input sample TII, and z is a latent variable GI drawn from a latent distribution $p_z$, e.g., a random normal distribution or similar. Many variations of the above training objective are possible however.

Figure 3:
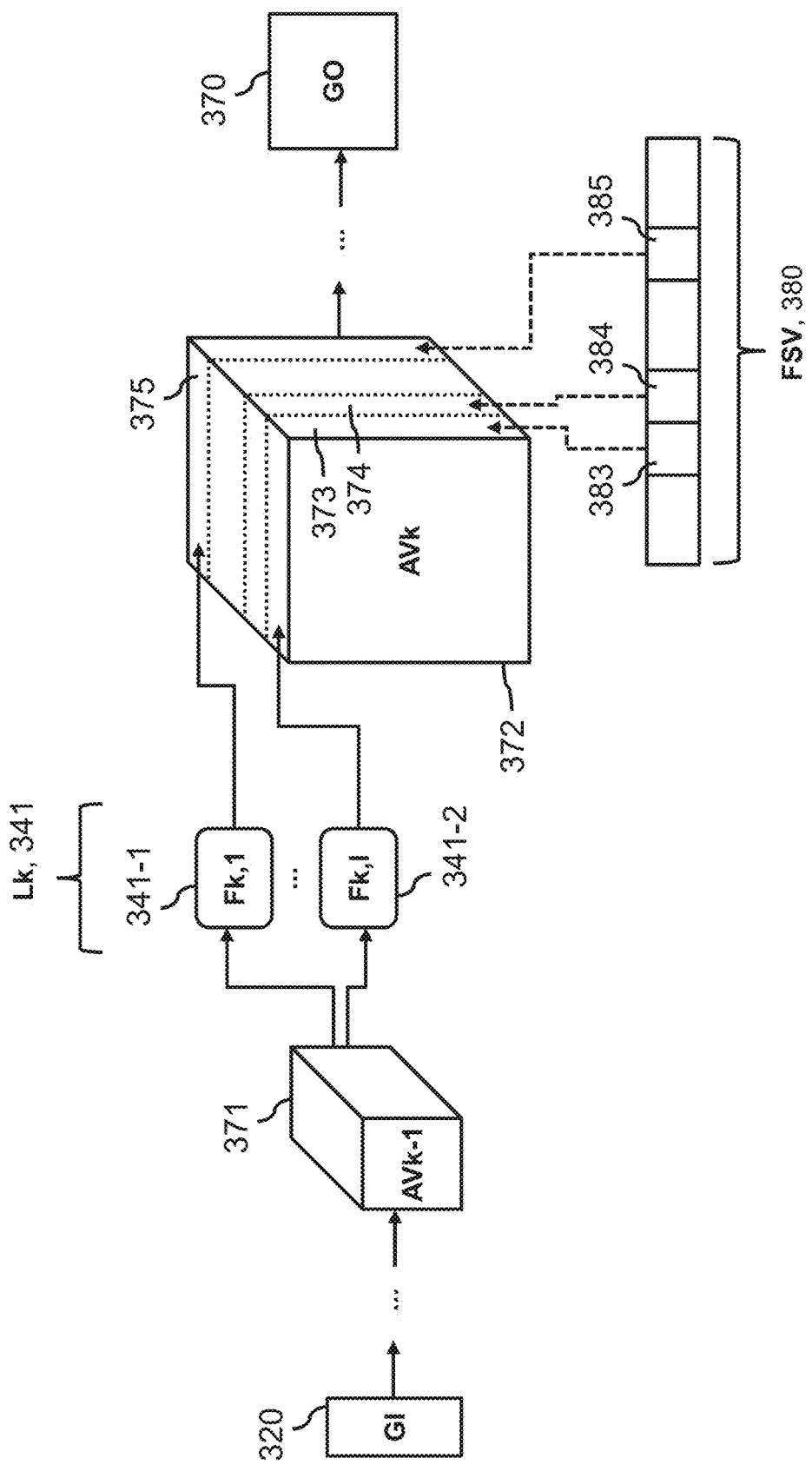
FIG. 3 shows an example of a generative model comprising multiple filters, and its manipulation with filter suppression factors, in accordance with an example embodiment of the present invention.

FIG. 3 shows a detailed, yet non-limiting example of a generative model comprising multiple filters, and its manipulation with filter suppression factors.

Shown in the figure is a generative model configured to generate an output GO, 370 (e.g., an input instance to a trained classifier), from a generator input GI, 320. For example, this generative model can be a decoder part of an autoencoder, as discussed, e.g., with respect to FIG. 2*a*; or a generator part of a generative adversarial network, as discussed, e.g., with respect to FIG. 2*b*.

Typically, the generator input GI is a feature vector, e.g., comprising at most or at least 100, or at most or at least 1000 entries. The output GO being generated can in general take various shapes but is in many cases generated as N-D spatial data, e.g., 2-D, or 3-D. For example, image data is an example of such data, but also various other types of sensor data can be represented in this way and can accordingly be synthetically generated using a generative model that outputs N-D spatial data.

Typically, the input GI to the generative model is much smaller than the generated output GO in terms of the number of elements it has. For example, the number of elements (e.g., features) of the generator input GI can be at most 10% or even at most 1% of the number of entries of the output it produces. Accordingly, the generator input GI may effectively provide a compressed representation of the output it produces. It has in various practical situations been observed, e.g., for generative adversarial networks as well as for autoencoders, that a semantic meaning can be associated to particular entries, or combinations of entries, of the generator input GI; e.g., one group of entries of the generator input GI may be responsible for generating ears in a facial image whereas another group of entries may be responsible for generating glasses. Accordingly, by adjusting generator inputs GI, variations of a generated output GO may be obtained.

The generative model shown in this figure uses a set of filters to generate its output GO. These filters are typically arranged at a number of layers of the generative model. In particular, the generative model may be evaluated by computing activation values of subsequent layers of the generative model based on the activation volumes of previous layers, starting from generator input GI and finally arriving at output GO. For example, the number of internal layers (so all layers apart from the input and output layer) can be at most or at least 5, at most or at least 10, or at most or at least 20.

At least some of these layers comprise one or more filters. The figure shows a layer Lk, 341, of the generative model that comprises (and in this case, actually consists of) multiple filters. The figure shows filters Fk,1, 341-1, up to Fk,l, 341-2. The number of filters at a layer can be, e.g., at most or at least 128, or at most or at least 1024.

A filter may be a parametrized function computing part of the output activation volume AVk, 372, of the layer Lk from the activation volume AVk-1, 371, of the preceding layer. Accordingly, as shown in the figure, an activation volume at a layer Lk of the generative model may comprise slices determined by respective filters, which each slice having the same spatial dimensions, e.g., in 2-D or 3-D. For example, shown in the figure are respective slides 373, 374, and 375 of the activation volume AVk of layer Lk; slice 375 is for example determined as the filter output of filter Fk,1; slice 373 is determined as the filter output of filter Fk,l; etcetera. Accordingly, a layer may be decomposed into multiple filters Fk,j that can be separately evaluated to determine their respective filter outputs, and accordingly, whose activity can be separately suppressed.

Typically, the filters Fk,j are convolutional filters, e.g., a filter computing a filter output by applying a convolution operator to the activation volume Avk-1 at the previous layer. Models that use such convolution operators are known as convolutional neural networks. A convolutional filter may be parametrized by convolution coefficients, which are accordingly trained when training the generative model. However, other filters that perform separate transformations at a layer of the generative model are also possible.

Various model architectures for generative models based on filters are known and can be used per se. Some models are so-called fully convolutional network, in which each layer of the network comprises multiple convolutional filters. An example of such a generative model, the so-called "DCGAN", is described in A. Radford et al., "Unsupervised Representation Learning with Deep Convolutional Generative Adversarial Networks" (available at https://arxiv.org/abs/1511.06434 and incorporated herein by reference). Another example of a fully convolutional network is the U-Net architecture described in O. Ronneberger et al., "U-Net: Convolutional Networks for Biomedical Image Segmentation" (available at https://arxiv.org/abs/1505.04597 and incorporated herein by reference).

It is not needed however to have multiple filters at all layers of the generative model, e.g., the model may have one or more fully connected layers followed by multiple layers each comprising multiple filters. In many generative models the number of filters at subsequent layers is often decreasing or at least non-increasing, e.g., a layer may have half the number of filters as a preceding layer, e.g., 512 filters, followed by 256 filters, followed by 128 filters, etc. Accordingly, the total number of filters of a generative model can be, for example, at most or at least 500, at most or at least 2000, or at most or at least 2000. Dimensions of subsequent activation volumes are often chosen to be increasing, or at least non-decreasing. For example, the width and height of an activation volume at a layer may be double that of the previous layer.

As illustrated in the figure, the process of generating an output GO based on a given generator input GI may be manipulated by modulating one or more filters of the generative model according to filter suppression factors. Accordingly, if the generator input GI corresponds to an input of a trained classifier, by means of such modulation, an adapted input for the trained classifier may be obtained.

Specifically, shown in the figure is a vector FSV, 380, of filter suppression factors for respective filters of the generative model. Shown specifically are filter suppression factors 383, 384, and 385 corresponding to respective filters of layer Lk; for example, filter suppression factor 383 corresponds to filter Fk,l whereas filter suppression factor 385 corresponds to filter Fk,1. Generally, vector FSV can provide filter suppression factors for all filters of the generative model, or for a subset of them, e.g., for all filters at a given subset of layers, or for an arbitrary subset of filters. Suitable selections of filters for determining classification explanations are discussed elsewhere.

Determining an output of the generative model adapted according to a set of filter suppression factors FSV may comprise modulating filter outputs of the corresponding filters according to the respective filter suppression factors FSV. A filter suppression factor can indicate a degree of suppression for the corresponding filter output in various ways. For example, the filter suppression factor can be a value between 0 and 1, with 0 indicating to fully suppress the filter output and 1 to fully preserve the filter output (e.g., no suppression). Accordingly, a filter may be modulated according to a filter suppression factor by multiplying each feature of the filter output according to the filter suppression factor. Similarly, the filter suppression factor can be a boolean, with True indicating suppression and False indicating no suppression, in which case a filter output can be modulated by keeping the filter output if the filter suppression factor is set to False and resetting (e.g., to zero or another neutral value) the filter output otherwise. Many variants will be apparent.

Accordingly, an adapted output of the generative model may be obtained by applying the generative model. This may comprise determining, at a layer, e.g., Lk, the output volume, e.g., AVk, of the generative model at that layer. In particular, filters may be applied to the previous layer output volume AVk-1. The determined output volume AVk may comprise the filter outputs of one or more filters for which filter suppression factors are to be applied. In this case, the filter output of a filter comprised in the output volume may be modulated according the corresponding filter suppression factor, e.g., by multiplication as described above. For example, as illustrated in the figure, filter output 373 of filter Fk,l may be modulated according to filter suppression factor 383; filter output 374 may be modulated according to filter suppression factor 384; and filter output 375 may be modulated according to filter suppression factor 385. Of course, computation of a filter output of a fully suppressed filter can be skipped. Accordingly, an adapted output volume AVk may be obtained that can be used to evaluate subsequent layers of the generative model (possible involving additional suppressions). Accordingly, filter suppression factors FSV may be applied at respective layers of the generative model to eventually arrive at the generative model output GO.

FIG. 4a shows a detailed, yet non-limiting example of how to determine one or more filter suppression factors for explaining a classification.

In this example, an explanation of a classification of one or more classifier inputs CI, 410, of a trained classifier TC, 430, is determined. The classification is explained in terms of the effect on the classification of adapting classifier input CI according to a set of filter suppression factors FSV, 480. To this end, first, a generator input GI, 420 may be determined that causes a generative model Dec, 440, to approximately generate the classifier input CI. Having determined generator input GI, filter suppression factors FSV may then be used to manipulate the process by which classifier inputs are generated from the determined generator input GI, with these manipulations resulting in an adapted classifier input ACI, 470. If the manipulations affect the classification (e.g., the adapted classifier input ACI is classified into a different class) by the trained classifier TC, then the filter suppression factors FSV corresponding to these manipulations indicate filters relevant to the classification by classifier TC and may accordingly be considered to explain the classification.

Shown in the figure is a classifier input CI whose classification is to be explained. In this figure, a single classifier input CI is shown, but as is discussed throughout, it is also possible to determine an explanation of multiple classifier inputs CI that are all classified into the same class. The classifier input CI can for example be an image, e.g., with dimensions M×N×1 (greyscale) or M×N×3 (color, e.g., RGB). The classifier input CI can also represent various other types of sensor data, e.g., represented as an image, as a feature vector, etc.

The figure also shows a trained classifier TC. Given a classifier input CI, trained classifier TC may be configured to classify the classifier input CI into one of a predefined set of classes. For example, the classifier may be a binary classifier, classifying classifier input CI into one of two classes; or a multiclass classifier, classifying the classifier input CI into one of three or more classes. For example, an image of a manufactured product may be classified as "OK" or "NOT OK", or a traffic sign detected in the surroundings of an autonomous vehicle may be classified as a particular type of traffic sign, e.g., a speed sign, a pedestrian crossing sign, etc. Many types of classifiers are known from the literature, and generally, any classifier suitable for the type of classifier input CI may be used.

The output of trained classifier TC is referred to herein as a classifier output. For example, as shown in the figure, given classifier input CI, trained classifier TC may determine an original classifier output OCO, 460. Although a classifier output determined by the trained classifier TC can simply represent the class that the input is classified into, typically, the classifier output contains additional information. In particular, the classifier output may comprise classification scores for respective classes. A classification score for a class may be indicative of a similarity of the classifier input CI to that class, or, in other words, of a likelihood of the classifier input CI belonging to that class. The classifier input CI may thus be classified into the class with the highest classification score. In case of binary classification, the classifier output can also comprise a classification score for just one of the two classes, the classification score for that other class following implicitly.

Also shown in this figure are an encoder part Enc, 450, and a decoder part Dec, 440, of an autoencoder. The encoder part Enc is configured to determine a generator input GI, 420, from a classifier input CI, whereas the decoder part Dec is a generative model configured to generate a classifier input for trained classifier TC from the generator input GI. For example, encoder part Enc and decoder part Dec may be as discussed in FIG. 2a. As also explained there, encoder part Enc and decoder part Dec are typically trained so that, when encoder part Enc is applied to classifier input CI to obtain generator input GI, that generator input GI causes the decoder part Dec to generate that classifier input CI as well as possible. Such generation is usually approximate since the encoding by the encoder part Enc typically loses some information contained in the classifier input CI.

Accordingly, in this particular example, a classifier input CI may be obtained as an input. Based in this classifier input CI, a generator input GI may be determined by the encoder part Enc, which input causes the decoder part Dec to approximately generate the classifier input. Instead of using decoder part Dec of an autoencoder, also other types of generative models can be used. Also in such cases, given a classifier input CI, a generator input GI may be determined that approximately generates the classifier input. An example of this is given in FIG. 4b. In other cases, generator input GI may be obtained as an input and classifier input CI may be determined from generator input GI by applying the generative model. An example of this is given in FIG. 4c.

The classification of classifier input(s) CI may be explained in terms of a set of filter suppression factors for multiple filters of the generative model Dec, in this case represented by a vector FSV of filter suppression factors. As explained with respect to FIG. 3, the generation process of a generative model Dec may be manipulated by modulating filter outputs of filters of the generative model Dec according to one or more filter suppression factors. Accordingly, by manipulating the generation process of the generative model Dec when applied to generator input GI, an adaptation ACI of the classifier input CI may be obtained. As shown in the figure, by applying the trained classifier TC to this adapted classifier input ACI, an adapted classifier output ACO, 462 affected by these filter suppression factors may be obtained.

Generally, various ways are possible to determine the filter suppression factors FSV based on their effect on classifications by the trained classifier TC. For example, it is possible to suppress individual filters, e.g., to adapt classifier input CI according to separate respective filter suppression factors, and to select filter suppression factors that have the biggest individual effect to on the classifications, e.g., that lead to the biggest drops in classification score for the class of classifier input CI. For example, a fixed number of filters with biggest effect may be selected, or filters whose effect exceeds a threshold.

In this figure, however, a preferred way of determining a vector of filter suppression factors FSV is shown based on performing an optimization Opt, 490, with respect to a target classifier output TCO, 461. The optimization may be configured to minimize a difference between the target classifier output and affected classifier outputs ACO of the trained classifier for the one or more classifier inputs as affected by the filter suppression factors FSV. At the same time, optimization Opt may minimizing an overall degree of suppression indicated by the filter suppression factors FSV. Accordingly, the optimization may encourage to approach the target classification output TCO with a minimal degree of suppression. Effectively, such an optimization may provide a trade-off in which additional suppressions are enabled in the vector of filter suppression factors FSV only if their contribution towards reaching the target classifier outbalances the increase in degree of suppression. Accordingly, an explanation may be provided that is most applicable and relevant to the classifier input.

Various ways of selecting the target classifier output TCO and measuring its difference with the adapted classifier output ACO are possible. For example, the target classifier output TCO may represent a classification score (e.g., a value between 0 and 1, or a boolean) for a particular class.

The difference with the adapted classifier output may be measured as a difference in classification score for that particular class.

For example, the class can be the original class into which the classifier input CI is classified by the trained classifier TC, as indicated by the original classifier output OCO. The classification score can be a low score for that class. In this case, the optimization may encourage removing aspects from the classifier input CI which cause the trained classifier TC to classify the classifier input CI into the original class. Thus an adapted classifier input ACI may be determined representing a counterfactual from which a minimal set of information is removed that is needed for the classification.

The classification score can also be set to, or close to, a decision boundary of the trained classifier for the original class. This may allow to generate an adapted classifier input ACI for which the uncertainty of the trained classifier TC is increased. Such adapted classifier instances can be useful for re-training the trained classifier, e.g., a desired classification of the adapted classifier input ACI may be obtained which can then be used as a label for such re-training. It is noted however that also other adapted classifier inputs, e.g., for which the trained classifier provides a wrong classification, can be used for retraining.

The particular class for which a classification score is used, can also another class than the original class. A high classification score for another class can encourage the optimization Opt to determine adapted classifier inputs ACI of that other class. Accordingly, an adapted classifier input ACI may be determined representing a counterfactual for which a minimal removal of information causes a classification into that particular class.

Many variations are possible. The target classification output TCO can also include multiple classification scores of respective classes, these respective classification scores being compared to that of the adapted classifier output OCO, e.g., in a L1 or L2 distance. For example, the classification score for the original class can be low and for one or more particular other classes can be high to encourage generation of counterfactuals from those classes. The target classification score can be determined automatically, e.g., based on the original classifier output OCO, or obtained as an input, e.g., from a user. The difference can also be based on classes rather than classification scores.

As a concrete example of an optimization Opt to be performed, let P denote a trained classifier that maps an input instance CI, e.g., a M×N×d-sized input image, to a 1D output vector y representing classification scores for respective classes, in other words probabilities for classes $y_k$ to be present in the input image.

As a first concrete example, an optimization Opt may be performed over multiple generator inputs z, by minimizing the following loss function:

$$x^* = \arg\min_x \int_z (|P(G_x(z)) - p_t| + D(G_x(z)) + L(x)) dz \quad (1)$$

This loss function is defined over the integration variable z. One such variable z corresponds to a possible generator input GI of the generative model G, Dec. Accordingly, an explanation may be provided for the multiple generator inputs being integrated over, and accordingly, a global explanation over the multiple generator inputs may be determined. The multiple generator inputs GI may be obtained once and remain static throughout the optimization, but it is also possible to dynamically sample generator inputs belonging to a given class as the optimization goes along, as also discussed w.r.t. FIG. 4c. By defining the loss over multiple z, the filters indicated by filter suppression factors FSV may reflect changes that need to be made in general, rather than for any one specific input.

In formula (1), $p_t$ represents the target classification output TCO in the form of a classification score for a particular class. Accordingly, $p_t$ may be a scalar value between 0 and 1 that references some probability target we are looking to achieve. For example, the target classification output may be set to 1 to encourage the generation of adapted classification instances from a class or to 0 to discourage it.

Accordingly, the term $|P(G_x(z)) - p_t|$ shown here is an example of a term that measures the distance between target classification output TCO and the probability output $P(G_x(z))$, ACO returned by the trained classifier TC when given the generated output $G_x(z)$ of Dec as an input, under the constraint that the filters of Dec have been modified as specified by the vector x of filter suppression values FSV. As explained elsewhere, instead of $|P(G_x(z)) - p_t|$, various other distance measuring terms are also possible.

The second term in formula (1) is optional but demonstrates how optimization Opt may be further configured to minimize a degree to which the output ACI of the generative model looks synthetic. The function D in this example is configured to provide high values for synthetic-looking inputs and low values for non-synthetic-looking inputs. For example, in case G is a generative part of a generative adversarial network, D can be the discriminative part. However, it also possible to use a separately trained model configured to determine a degree to which an output of the generative model seems synthetic. Including a degree of syntheticness is useful because it encourages the optimization Opt to prefer more realistic samples over ones that may seem more artificial.

As a third term, formula (3) includes regularization L(x) minimizing the overall degree of suppression indicated by the filter suppression factors FSV. Several options for minimizing the overall degree of suppression are available.

For example, regularization L(x) can be a sparsity-inducing norm on the filter suppression factors FSV, e.g., a L0 norm or a L1 norm. Of course, depending on how the filter suppression factors FSV represent suppression, these values may be transformed prior to computing the sparsity-inducing norm, e.g., so that filter suppression factors that do not indicate suppression are represented by 0 and filter suppression factors that indicate suppression are represented by non-zero values, e.g., 1 for full suppression. By preferring sparse vectors of filter suppression factors FSV, more specific classification explanations are determined. Also, having a relatively small number of filter suppression factors that indicate a suppression makes it easier to represent the explanation, e.g., to a user (e.g., in text form) or in further automated processing.

Based on uniqueness scores indicating uniqueness of respective filters, the regularization L(x) can penalize suppression of more unique filters less strongly than suppression of less unique filters. This can also help to provide more focussed explanations. For example, providing an explanation in terms of a filter that is more uniquely responsible for generating a particular object in a generated instance ACI (e.g., glasses in an image of a case) instead of one of a group of filters performing similar tasks, is preferred because it makes it easier to compare explanations for different classifier inputs CI. Another advantage is that more unique filters tend to reduce the possibility of adversarial solutions since the suppression of a more unique filter more directly corresponds to a manipulation of a particular object in the generated adapted classifier input ACI.

For example, uniqueness scores of filters may be obtained by applying an auxiliary network (not shown) on activations of the respective filters for the generator input GI. This network may return a quantitative measure of the number of nearby neighbours for each filter. Based on this quantitative measure, a high cost can be assigned to filters with many near neighbours, and a low cost to more unique filters. Instead of such an auxiliary network, e.g., also statistics such as differential entropy can be used to provide a uniqueness score, etc.

As another concrete example, a loss function for use in optimization Opt is now given that determines filter suppression factors FSV for a single classifier input CI and corresponding generator input GI, and accordingly looks at the local behaviour of the trained classifier as conditioned on this specific input sample. Compared to formula (1) above, the present loss function uses a single generator input $z^*$, GI, that approximately generates a classifier input T, CI:

$$x^* = \arg\min_x(|P(G_x(z^*))-p_t|+D(G_x(z))+L(x))], \text{ for } T \approx G_x(z^*) \quad (2)$$

In optimization Opt, the relative importance of the difference between target classifier output TCO and adapted classifier outputs ACO, and the overall degree of suppression, may be controlled by weighting respective terms by means of hyperparameters. Thus, the total energy distribution in the loss function may be balanced, e.g., enabling optimizers Opt such as SGD or ADAM to converge or to converge quicker. For example, these hyperparameters may be included in the objective functions (1) and (2) described above. The hyperparameters may be determined automatically, e.g., based on whether the optimization Opt succeeds in yielding an output that the model TC classifies differently than the original input image CI. For example, the hyperparameters can be determined in a grid search, e.g., by starting at some value, and if the optimization Opt does not produce a counterfactual, increasing the weight of the term that penalizes the distance of the output classification ACO to the target classification TCO.

As mentioned above, in general, filter suppression factors FSV for all filters of the generative model Dec, or for any subset of the filters, may be determined. Generally, a wide selection of filters is preferred for allowing to provide explanations in terms of a wide range of objects or other aspects that may or may not be present in the instances. For example, all filters (or at least 80%) of some or all layers of the generative model may be used; for example, of one, two, or at most or at least five layers. For example, using earlier layers (e.g., in the first half of the network) may encourage more low-level explanations in terms of relatively small aspects present in the instance, whereas using later layers (e.g., in the second half) may encourage more high-level explanations. Another good choice is to select at least 25%, or even at least 50%, of all filters in the generative model. For efficiency reasons, it is possible to make a random selection of filters and use these, in which case it can also suffice to use at least 10% of filters, for example.

Another good option is to select a subset of filters based on their uniqueness. As mentioned, it is possible to obtain uniqueness scores of respective filters. The optimization Opt may then determine filter suppression factors for only the most unique filters, e.g., a fixed amount or percentage of most unique filters, e.g., at most 25% or even at most 10% of most unique filters. This not only provides more focussed and more easily comparable explanations, but also makes the optimization more efficient by limiting the search space.

Generally, optimization Opt may be performed using any known optimization scheme, e.g., using gradient-based optimization such as stochastic gradient descent (SGD) or ADAM (see Kingma and Ba, "Adam: A Method for Stochastic Optimization", available at https://arxiv.org/abs/1412.6980 and incorporated herein by reference). Such optimization methods may be heuristic and/or arrive at a local optimum. Training may be performed on an instance-by-instance basis or in batches, e.g., of at most or at least 64 or at most or at least 256 instances. Typically the optimization is initialized starting with filter suppression factors that indicate no suppression, e.g., value 1.0. Various known stopping criteria may be used for the optimization, e.g., a maximum number of iterations, a threshold on the relative change of the objective function between adjacent iterations, etc.

The classification explanation for the classifier inputs CI may then be determined based on the filter suppression factors FSV. For this there are several possibilities. One possibility is to output the filter suppression factors FSV themselves as an explanation. Another option is to output the adapted classifier inputs ACI, for example, along with the corresponding original classifier inputs CI. For example, the classifier inputs ACI can be used to highlight parts of the classifier inputs CI in which the adapted classifier input is different, or the other way around.

Another possibility is to perform one or more comparisons between the classifier input CI and a corresponding adapted classifier input ACI to compute respective difference measures. Such difference measures can be used as a compact representation of the classification explanation, and accordingly of the classification decision itself, that can be used for further automated processing, e.g., as features of a machine learning model. Such difference measures can for example be based on a pixelwise difference, a difference in colour distribution, a difference in entropy, or various other summary statistics. For example, based on a pixelwise difference $G(z)-G_x(z)$, difference measures $\max(0, G(z)-G_x(z))$ and/or $\max(0, G_x(z)-G(z))$ can be determined. Another example is to compute $\text{hist}(G(z))-\text{hist}(G_x(z))$, where $\text{hist}(.)$ is an operator that returns the colour histogram of a given input image. These statistics can also be determined for and aggregated over (e.g., computing a mean and/or standard deviation) multiple classifier inputs CI.

FIG. 4b shows a detailed, yet non-limiting example of determining a generator input. This example can be used in FIG. 4a as an alternative way of obtaining the classifier input and/or the generator input.

In this example, a classifier input CI, 410, may be obtained as an input, and from that classifier input CI, a generator input GI, 420 may be determined that approximately generates the classifier input CI. In this example, this is achieved by performing optimization IOpt, 495. The optimization is configured to determine generator input GI by minimizing the difference between the classifier input CI', 410 that it generates, and the classifier input CI that was given as an input. For example, the optimization may comprise minimizing a loss function that contains this difference. Accordingly, a classifier input CI' may be found that best approximates the given classifier input CI. The classifier input CI' is typically determined by generative model Gen without applying feature suppression vectors. The optimization can include additional terms, e.g., a regularization term and the like.

For example, this example is applicable in case the generative model Gen is a generative part of a Generative Adversarial Network. For example, optimization IOpt may be implemented as described in A. Creswell et al., "Inverting The Generator Of A Generative Adversarial Network (∥)" (available at https://arxiv.org/abs/1802.05701 and incorporated herein by reference). Optimization IOpt can also be applied to other types of generative model, however. Generally, the various options for optimisation Opt of FIG. 4a also apply to optimization IOpt, for example, stochastic gradient descent or ADAM may be used.

FIG. 4c shows a detailed, yet non-limiting example of determining a generator input. This example can be used in FIG. 4a as an alternative way of obtaining the classifier input and/or the generator input.

In this example, a class CLS, 463, is obtained as input, and one or more generator inputs GI, 420, and corresponding classifier inputs CI, 410, are generated belonging to that class CLS. More specifically, a sampler Sam, 496, is used to generate generator inputs GI that cause the model to generate classifier inputs CI from the class CLS. This can be done using rejection sampling, e.g., the sampler Sam generates generator instances GI (e.g., randomly); the generative model Gen generates corresponding classifier inputs CI; the trained classifier TC, 430, classifies the classifier inputs CI into a class; and the sampler Sam checks whether the trained classifier has classified the classifier input CI into the class CLS. For example, this can be repeated for a given number of times or until the sampler Sam has generated a given number of generator instances GI causing the generative model to generate classifier inputs from the class CLS. The desired number of classifier inputs to be generated can for example be one, or more than one, e.g., at most or at least 10 or at most or at least 50.

Although sampler Sam typically only generates instances from class CLS, the sampler may apply additional selection criteria in addition. For example, the sampler may demand that the classification score for the given class CLS exceeds a given threshold, and/or that classification scores for one or more other classes do not exceed a given threshold. The additional selection criterion can also be based on a further machine learning model, e.g., a classifier, e.g., sampler Sam may select instances from the class CLS (e.g., pictures of traffic signs) that also satisfy another property (e.g., bad weather conditions, presence of another object) as indicated by the further machine learning model. This allows to study classification behaviour for the given class under boundary conditions.

It is also possible for sampler Sam to generate generator inputs GI and classifier inputs CI from class CLS as needed. For example, as also described with respect to FIG. 4a, an optimization Opt may be performed with respect to multiple classifier and generator inputs; new batches of inputs can be sampled by sampler Sam as needed, e.g., per iteration. By taking new samples, a bias due to a particular initial selection of generator/classifier inputs may be avoided.

Figure 5:
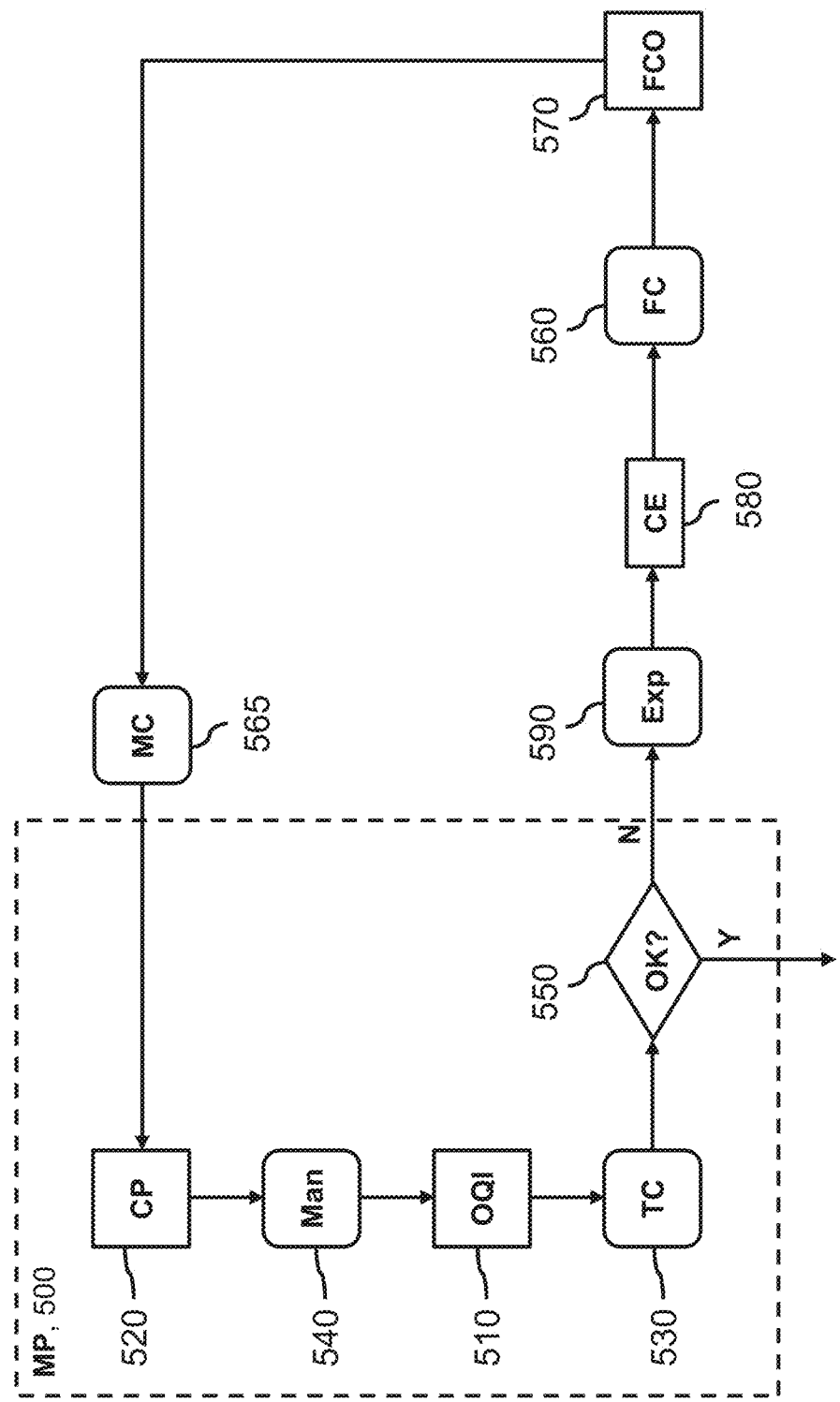
FIG. 5 shows an example of determining a classification explanation and using it to control a manufacturing process, in accordance with an example embodiment of the present invention.

FIG. 5 shows a detailed, yet non-limiting example of determining filter suppression factors and using the determined filter suppression factors for controlling a manufacturing process.

Shown in the figure is a manufacturing process MP, 500. During the manufacturing process, a manufacturing operation Man, 540, takes place. The manufacturing operation can be an assembly operation. The manufacturing process MP is based on control parameters CP, 520.

As is known in the art of manufacturing engineering, manufacturing processes are often highly parameterized procedures, defining strict rules on how its physical systems operate in order to produce individual samples. For example, in an assembly line, control parameters CP of the manufacturing process may include quantity of applied pressure, heat, torque, force, weld time, etc. Hence, it is valuable to obtain insight into how varying these parameters affects, e.g. the production of NOK, Not OK, samples. For instance, applying too much pressure could fracture a sample, and the like. Such insight may lead to, for instance, a more efficient manufacturing process. Various aspects of the invention may be applied to gain explanations, e.g., determine anomalies, from images OQI, 510 of products produced in the manufacturing process MP, made by an optical quality inspection system. Optionally, these insights can be fed back to the manufacturing process MP itself, thereby closing the automation loop by incorporating knowledge, e.g., of how NOK samples are produced.

Accordingly, the optical quality inspection image OQI may be fed into trained classifier TC, 530, to determine whether the produced process belongs to an "OK" class of successfully manufactured products, or a "Not OK" (NOK) class of products that were not manufactured successfully. For example, based on the output of trained classifier TC, the manufacturing process MP may be configured to further process the product or discard it.

Moreover, if the product was not manufactured successfully, in an explanation operation Exp, 590, a classification explanation CE, 580, may be determined as described herein. For example, the classification explanation CE may be based on filter suppression factors determined as described herein, e.g., the classification explanation CE may comprise the filter suppression factors and/or metrics derived from them.

The classification explanation CE can be fed into a further classifier FC, 560, to classify the classification explanation CE into a predefined set of possible anomalies. The classifier can be trained automatically but can also comprise applying one or more predefined defined criteria, e.g., a criterium comprising that an adapted classifier input differs from the original optical quality inspection image OQI in a specific part of the image. Classifying the classification explanation CE may also comprise applying a pretrained model or performing a clustering into a set of explanations/anomalies produced by a predefined set of validation data samples, for example.

The classification into the predefined set of anomalies may, in a manufacturing control operation MC, 565, be signalled back to control the manufacturing process MP. For example, the signalling may be performed using known automation protocols. Various types of actions can be taken by the manufacturing process, including but not limited to flagging the product for manual inspection, steering a sorting system, operating the manufacturing process in a safe mode, or altering one or more control parameter CP of the manufacturing process MP to reflect the newest explanations.

The adjustment can be performed, for example, according to a predetermined set of rules. For example, if the difference between the optical quality inspection image II and the determined adapted classifier instance indicates small localized defects that are known to be possible side effects of a particular setting of the manufacturing process, e.g., high temperatures, pressure, etc. at some stage of the processing pipeline, then the control parameters CP may be automatically adjusted to decrease the probability of the defect re-occurring in the future. Correspondence between explanations and operating parameter settings over multiple samples may also be used to train a machine learning system to learn optimal operating parameter settings. For example, it is possible to use a reinforcement-learning based system that takes the classification explanation CE and/or the further classification output FCO as an input and determines an action to be performed based on that. The reinforcement-based system can also replace the further classifier.

By using a predefined set of anomalies, explanations may be constrained to a discrete set of possibilities, e.g., a physical defect in a specific location on the sample, a change in the control conditions such as lighting during the manufacturing process, etc. E.g., such a physical defect may be characterized by an explanation highlighting essentially a specific region of the image whereas a change in lighting conditions may result in an explanation highlighting essentially the whole image.

Figure 6:
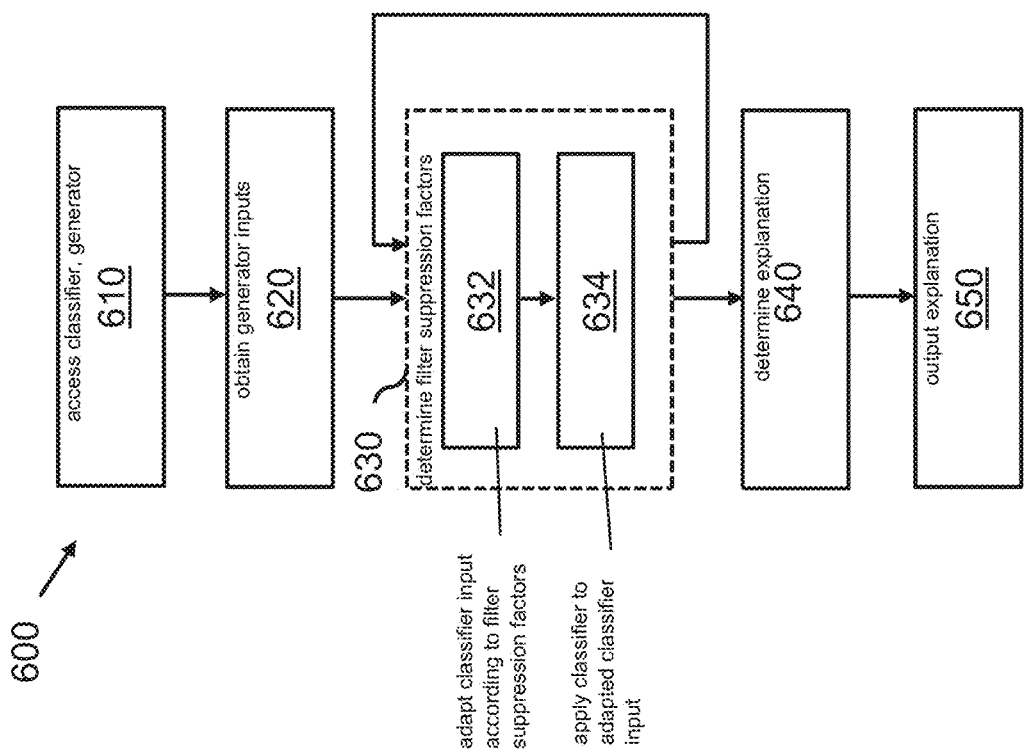
FIG. 6 shows a computer-implemented method of determining an explanation, in accordance with an example embodiment of the present invention.

FIG. 6 shows a block-diagram of computer-implemented method 600 of determining a classification explanation for a trained classifier. The classification explanation may be for one or more classifier inputs classified by the trained classifier into a same class. The method 600 may correspond to an operation of the system 100 of FIG. 1. However, this is not a limitation, in that the method 600 may also be performed using another system, apparatus or device.

The method 600 may comprise, in an operation titled "ACCESSING CLASSIFIER, GENERATOR", accessing 610 model data defining the trained classifier and model data defining a generative model. The generative model may be configured to generate a classifier input for the trained classifier from a generator input. The generative model may comprise multiple filters. A filter of the generative model may be configured to generate a filter output at an internal layer of the generative model.

The method 600 may comprise, in an operation titled "OBTAINING GENERATOR INPUTS", obtaining 620 generator inputs corresponding to the one or more classifier inputs. A generator input may cause the generative model to approximately generate the corresponding classifier input.

The method 600 may comprise, in an operation titled "DETERMINING FILTER SUPPRESSION FACTORS", determining 630 filter suppression factors for the multiple filters of the generative model. A filter suppression factor for a filter may indicate a degree of suppression for a filter output of the filter. The filter suppression factors may be determined based on an effect of adapting the classifier inputs according to the filter suppression factors on the classification by the trained classifier.

The determining 630 of the filter suppression factors may comprise, in an operation titled "ADAPTING CLASSIFIER INPUT ACCORDING TO FILTER SUPPRESSION FACTORS", adapting 632 a classifier input according to one or more filter suppression factors by applying the generative model to the generator input corresponding to the classifier input, while modulating filter outputs of filters of the generative model according to the one or more filter suppression factors.

The determining 630 of the filter suppression factors may further comprise, in an operation titled "APPLYING CLASSIFIER TO ADAPTED CLASSIFIER INPUT", applying 634 the trained classifier to the adapted classifier input to obtain a classifier output affected by the one or more filter suppression factors.

The method 600 may comprise, in an operation titled "DETERMINING EXPLANATION", determining 640 the classification explanation based on the filter suppression factors. The method 600 may further comprise, in an operation titled "OUTPUTTING EXPLANATION", outputting 650 the classification explanation.

It will be appreciated that, in general, the operations of method 600 of FIG. 6 may be performed in any suitable order, e.g., consecutively, simultaneously, or a combination thereof, subject to, where applicable, a particular order being necessitated, e.g., by input/output relations.

Figure 7:
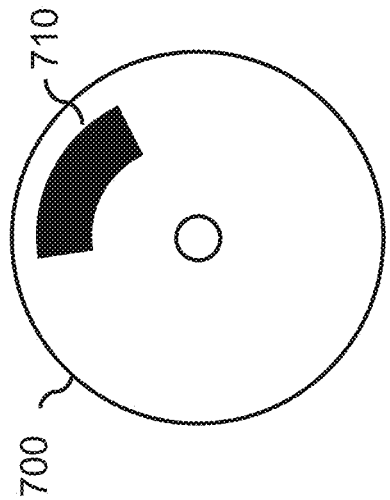
FIG. 7 shows a computer-readable medium comprising data, in accordance with an example embodiment of the present invention.

The method(s) may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700. Alternatively, the computer readable medium 700 may comprise transitory or non-transitory data 710 representing decoder model data for predicting object feature vectors of multiple interacting physical objects as described herein; and/or encoder model data for classifying pairwise interactions between multiple physical objects into a set of multiple interaction types as described herein.

Examples, embodiments or optional features, whether indicated as non-limiting or not, are not to be understood as limiting the present invention.

It should be noted that the above-mentioned embodiments illustrate rather than limit the invention, and that those skilled in the art will be able to design many alternative embodiments without departing from the scope of the present invention. Use of the verb "comprise" and its conjugations does not exclude the presence of elements or stages other than those stated. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device enumerated by several means, several of these means may be embodied by one and the same item of hardware. The mere fact that certain measures are recited in mutually separately does not indicate that a combination of these measures cannot be used to advantage.

What is claimed is:

1. A computer-implemented method of determining a classification explanation for a trained classifier, the classification explanation being for one or more classifier inputs classified by the trained classifier into a same class, the method comprising the following steps:

accessing model data defining the trained classifier and model data defining a generative model, the generative model being configured to generate a classifier input for the trained classifier from a generator input, the generative model including multiple filters, each filter of the generative model being configured to generate a filter output at an internal layer of the generative model;

obtaining generator inputs corresponding to the one or more classifier inputs, each generator input causing the generative model to approximately generate the corresponding classifier input;

determining filter suppression factors for the multiple filters of the generative model, each filter suppression factor for each filter indicating a degree of suppression for the filter output of the filter, the filter suppression factors being determined based on an effect of adapting the classifier inputs according to the filter suppression factors on the classification by the trained classifier, the determining including:
  adapting each classifier input according to one or more of the filter suppression factors by applying the generative model to the generator input corresponding to the classifier input, while modulating the filter outputs of the filters of the generative model according to the one or more filter suppression factors, and
  applying the trained classifier to each adapted classifier input to obtain a classifier output affected by the one or more filter suppression factors;
determining the classification explanation in terms of the filter suppression factors such that the classification explanation excludes any image representation and comprises a set of the filter suppression factors, and outputting the classification explanation, wherein:
  the trained classifier is an image classifier, and
  the classifier input includes an image of a product produced in a manufacturing process;
controlling the manufacturing process based on the classification of the classification explanation; and
determining the filter suppression factors by performing an optimization configured to: (i) minimize a difference between a target classifier output and affected classifier outputs of the trained classifier for the one or more classifier inputs affected by the filter suppression factors, and (ii) minimize an overall degree of suppression indicated by the filter suppression factors.

2. The method of claim 1, the method further comprises classifying the classification explanation into a predefined set of possible anomalies.

3. The method of claim 1, further comprising:
accessing a discriminative model configured to determine a degree to which an output of the generative model is synthetic, the optimization being further configured to minimize the degree for the one or more adapted classifier inputs.

4. The method of claim 1, further comprising:
obtaining uniqueness scores indicating uniqueness of respective filters, wherein the minimization of the overall degree of suppression penalizes suppression of more unique filters less strongly than suppression of less unique filters.

5. The method of claim 1, wherein the determining of the classification explanation includes determining a difference between each classifier input and a corresponding adapted classifier input.

6. The method of claim 5, wherein the difference is a pixelwise difference, or a difference in color distribution, or a difference in entropy.

7. The method of claim 1, wherein each filter output of the filters of the generative model is modulated according to a filter suppression factor by multiplying elements of the filter output with the filter suppression factor.

8. The method of claim 1, further comprising obtaining a first classifier input, and determining a first generator input corresponding to the first classifier input.

9. The method of claim 1, further comprising obtaining a class of the trained classifier and generating one or more generator inputs causing the generative model to generate classifier inputs from the class.

10. The method of claim 1, further comprising outputting the classification explanation in a sensory perceptible manner to a user.

11. The method of claim 10, wherein at least the adapted classifier input is output to the user, the method further comprising obtaining a desired classification of the adapted classifier input from the user for re-training the trained classifier using the adapted classifier input and the desired classification.

12. A system for determining a classification explanation for a trained classifier, the classification explanation being for one or more classifier inputs classified by the trained classifier into a same class, the system comprising:
  a data interface configured to access model data defining the trained classifier and model data defining a generative model, the generative model being configured to generate a classifier input for the trained classifier from a generator input, the generative model including multiple filters, each filter of the generative model being configured to generate a filter output at an internal layer of the generative model;
  a processor subsystem configured to:
    obtain generator inputs corresponding to the one or more classifier inputs, each generator input causing the generative model to approximately generate the corresponding classifier input;
    determine filter suppression factors for the multiple filters of the generative model, each filter suppression factor for each filter indicating a degree of suppression for the filter output of the filter, the filter suppression factors being determined based on an effect of adapting the classifier inputs according to the filter suppression factors on the classification by the trained classifier, the determining including:
      adapting each classifier input according to one or more of the filter suppression factors by applying the generative model to the generator input corresponding to the classifier input, while modulating the filter outputs of the filters of the generative model according to the one or more of the filter suppression factors, and
      applying the trained classifier to the adapted classifier input to obtain a classifier output affected by the one or more filter suppression factors; and
    determine the classification explanation in terms of the filter suppression factors such that the classification explanation excludes any image representation and comprises a set of the filter suppression factors, and output the classification explanation, wherein:
      the trained classifier is an image classifier,
      the classifier input includes an image of a product produced in a manufacturing process, and
      the manufacturing process is controlled based on the classification of the classification explanation; and
    determine the filter suppression factors by performing an optimization configured to: (i) minimize a difference between a target classifier output and affected classifier outputs of the trained classifier for the one or more classifier inputs affected by the filter suppression factors, and (ii) minimize an overall degree of suppression indicated by the filter suppression factors.

13. A non-transitory computer-readable medium on which is stored a computer program for determining a classification explanation for a trained classifier, the classification explanation being for one or more classifier inputs classified by the trained classifier into a same class, the computer program, when executed by a processor system, causing the processor system to perform the following steps:
  accessing model data defining the trained classifier and model data defining a generative model, the generative model being configured to generate a classifier input for the trained classifier from a generator input, the generative model including multiple filters, each filter of the generative model being configured to generate a filter output at an internal layer of the generative model;

obtaining generator inputs corresponding to the one or more classifier inputs, each generator input causing the generative model to approximately generate the corresponding classifier input;

determining filter suppression factors for the multiple filters of the generative model, each filter suppression factor for each filter indicating a degree of suppression for the filter output of the filter, the filter suppression factors being determined based on an effect of adapting the classifier inputs according to the filter suppression factors on the classification by the trained classifier, the determining including:

adapting each classifier input according to one or more of the filter suppression factors by applying the generative model to the generator input corresponding to the classifier input, while modulating the filter outputs of the filters of the generative model according to the one or more filter suppression factors, and applying the trained classifier to each adapted classifier input to obtain a classifier output affected by the one or more filter suppression factors; and determining the classification explanation in terms of the filter suppression factors such that the classification explanation excludes any image representation and comprises a set of the filter suppression factors, and outputting the classification explanation, wherein:

the trained classifier is an image classifier, the classifier input includes an image of a product produced in a manufacturing process, the manufacturing process is controlled based on the classification of the classification explanation; and determining the filter suppression factors by performing an optimization configured to: (i) minimize a difference between a target classifier output and affected classifier outputs of the trained classifier for the one or more classifier inputs affected by the filter suppression factors, and (ii) minimize an overall degree of suppression indicated by the filter suppression factors.

* * * * *